(12) United States Patent
Fukuda et al.

(10) Patent No.: US 12,319,035 B2
(45) Date of Patent: Jun. 3, 2025

(54) LAMINATED FILM AND PACKAGING BAG

(71) Applicant: TOPPAN Holdings Inc., Tokyo (JP)

(72) Inventors: Yuka Fukuda, Tokyo (JP); Masaki Sato, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/833,683

(22) PCT Filed: Feb. 14, 2023

(86) PCT No.: PCT/JP2023/004963
§ 371 (c)(1),
(2) Date: Jul. 26, 2024

(87) PCT Pub. No.: WO2023/153521
PCT Pub. Date: Aug. 17, 2023

(65) Prior Publication Data
US 2025/0100255 A1    Mar. 27, 2025

(30) Foreign Application Priority Data
Feb. 14, 2022 (JP) .................................. 2022-020528

(51) Int. Cl.
*B32B 27/08* (2006.01)
*B32B 27/32* (2006.01)
(Continued)

(52) U.S. Cl.
CPC ............... *B32B 27/08* (2013.01); *B32B 27/32* (2013.01); *B32B 27/36* (2013.01); *B65D 75/26* (2013.01);
(Continued)

(58) Field of Classification Search
CPC ......... B32B 27/08; B32B 27/32; B32B 27/36; B32B 2250/02; B32B 2250/244;
(Continued)

(56) References Cited

U.S. PATENT DOCUMENTS

2016/0368236 A1* 12/2016 Iwase .................... B32B 27/308
2022/0153006 A1    5/2022 Tanaka et al.

FOREIGN PATENT DOCUMENTS

| JP | 11-170430 | 6/1999 |
| JP | 2018-158530 | 10/2018 |

(Continued)

OTHER PUBLICATIONS

Chinese Office Action issued in counterpart Chinese Application No. dated Oct. 24, 2024.
(Continued)

*Primary Examiner* — James C Yager
(74) *Attorney, Agent, or Firm* — STAAS & HALSEY LLP

(57) ABSTRACT

A laminated film including a barrier layer and at least one adjacent layer that is adjacent to the barrier layer, in which the barrier layer has a barrier base material and a coat layer that is provided on one surface of the barrier base material so as to face the adjacent layer, the coat layer is composed of an aluminum particle layer composed of aluminum particles and a resin composition that is loaded into gaps in the aluminum particle layer, and the barrier base material and the adjacent layer include the same resin.

14 Claims, 8 Drawing Sheets

(51) Int. Cl.
  *B32B 27/36* (2006.01)
  *B65D 75/26* (2006.01)
(52) U.S. Cl.
  CPC ..... *B32B 2250/02* (2013.01); *B32B 2250/244* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2307/518* (2013.01); *B32B 2307/7244* (2013.01); *B32B 2307/7246* (2013.01); *B32B 2307/748* (2013.01); *B32B 2439/46* (2013.01)
(58) Field of Classification Search
  CPC ............ B32B 2255/10; B32B 2255/20; B32B 2255/205; B32B 2255/26; B32B 2255/28; B32B 2307/518; B32B 2307/7244; B32B 2307/7246; B32B 2307/748; B32B 2439/46; B65D 75/26
  See application file for complete search history.

(56) References Cited

FOREIGN PATENT DOCUMENTS

| JP | 2019-014137 | 1/2019 |
|---|---|---|
| JP | 2020-157715 | 10/2020 |
| JP | 2020-157718 | 10/2020 |
| JP | 2020-157719 | 10/2020 |
| JP | 2020-157729 | 10/2020 |
| JP | 2020-189893 | 11/2020 |
| JP | 2021-020391 | 2/2021 |
| JP | 2021-024112 | 2/2021 |
| JP | 2015-184169 | 10/2022 |
| JP | 2023-039112 | 3/2023 |
| JP | 7347718 | 9/2023 |
| JP | 2019-166810 | 10/2024 |
| JP | 2021-183416 | 12/2024 |
| WO | WO 2018/147137 A1 | 8/2018 |
| WO | WO 2020/095751 A1 | 5/2020 |

OTHER PUBLICATIONS

M.H. Behbahani et al., "The thickness and deposition rate effects on structural and optical properties of aluminized PET", Applied Physics, Apr. 21, 2019, vol. 126, Article No. 356, p. 1-p. 4.
Ceflex consortium, "Designing for a Circular Economy Guidelines summary", Jun. 2020, p. 1-p. 4.
Toray Film Processing Co., Ltd., "Aluminum Vapor Deposition Barrier Film VM-PET Catalog", 2024, p. 1-p. 3+.
Japanese Office Action issue in counterpart Japanese Application No. 2023-535697 dated Jun. 13, 2024.
Japanese Office Action issue in counterpart Japanese Application No. 2023-535697 dated Jul. 3, 2024.
International Search Report issue in International Application No. PCT/JP2023/004963 dated Apr. 11, 2023.
Decision to Grant a Patent issued in counterpart Japanese Application No. 2023-535697 dated Aug. 8, 2023.
English Translation of IPRP (PCT/IB/338 and PCT/IB/373) (Aug. 29, 2024 and Aug. 20, 2024) and the Written Opinion of ISA (PCT/ISA/237) issued in counterpart International Application No. PCT/JP2023/044963 on Apr. 11, 2023 (5 pages).
Kazuo Yuki et al, "Saturated Polyester Resin Handbook", Nikkan Kogyo Shimbunsha, First Edition, First Printing, Dec. 22, 1989, p. 209-p. 212.
Iguchi Akinori et al, "Deterioration Mechanistic Evaluation of PET Film", General Incorporated Association Japan Society of Plastic Processing, Effects of Degradation, 2014, vol. 26, No. 9, 2014, p. 444-p. 449.
Toray Advanced Film Co., Ltd, "Product catalog of "BR-PET1312" aluminum evaporated film manufactured by Toray Advanced Film Co., Ltd", Jan. 1, 2023, p. 1.
Mitsui Chemicals Tohcello, Inc., "Product catalog of ML-OP102 aluminum evaporated film manufactured by Mitsui Chemicals Tohcello, Inc.", 2024, p. 1-p. 2.
TOPPAN Inc., "Toppan's Web site and the Internet, Introduction of Mono-Material Barrier Packages for the Realization of a Sustainable Society", https://www.toppan.com/ja/living-industry/packaging/topics/column/index.html, https://www.toppan.com/ja/living-industry/packaging/topics/column/005/index.html, Jun. 2022, p. 1-p. 8.
TOPPAN Inc., "Toppan's Web site and the Internet, Toppan Printing Develops Mono-Material Flexible Packaging for Single PET", https://www.holdings.toppan.com/ja/news/2019/07/newsrelease190702_1.html, Jul. 2, 2019, p. 1-p. 2.
Japanese Office Action issued in counterpart Japanese Application No. 2024-700232 dated Dec. 25, 2024.
Extended European Search Report issued in counterpart European Application No. 23752983.9, dated Apr. 14, 2025.

* cited by examiner

LAMINATED FILM AND PACKAGING BAG

CROSS-REFERENCE TO RELATED APPLICATIONS

This application is a 35 U.S.C. § 371 national phase application of PCT/JP2023/004963, filed on Feb. 14, 2023, which claims priority to Japanese Patent Application No. 2022-020528, filed on Feb. 14, 2022, the contents of all of which are incorporated herein by reference.

TECHNICAL FIELD

The present disclosure relates to a laminated film and a packaging bag.

BACKGROUND ART

As an eco-friendly effort, an initiative of making plastic packaging bags with a single type of material (mono-material) is becoming widespread to accelerate the recycling of plastic packaging bags. For example, a polyethylene laminate for a packaging material including a stretched polyethylene film, a polyethylene layer including a vapor deposited film and a heat-sealing polyethylene layer in this order is proposed in Patent Literature 1 below.

CITATION LIST

Patent Literature

[Patent Literature 1] Japanese Unexamined Patent Publication No. 2019-166810

SUMMARY OF INVENTION

Technical Problem

Among such packaging bags, a packaging bag composed of a polyester film is drawing attention from the viewpoint of the recyclability. Biaxially stretched polyethylene terephthalate (PET) films that are used for such packaging bags are excellent in terms of toughness and barrier properties as a base material layer and low adsorption as a sealant layer. Therefore, in packaging bags composed of a biaxially stretched PET film, toiletry products, food, cosmetics and the like can be suitably accommodated as contents.

In addition, there are cases where an aluminum particle layer is provided in a packaging bag by aluminum vapor deposition to impart light-shielding properties and barrier properties.

However, it was clarified by the present inventors' studies that, in the case of forming a laminated film that is composed of a polyester film and includes an aluminum particle layer as a vapor deposition layer, the laminated film has the following problem. That is, when alkaline or acidic contents are loaded into a packaging bag that is obtained using the laminated film and stored for a long period of time, the aluminum particle layer dissolves in the laminated film. There is a concern that the dissolution of the aluminum particle layer may cause deterioration of barrier properties, light-shielding properties and laminate strength and poor external appearance.

An objective of the present disclosure is to provide a laminated film and a packaging bag capable of curbing dissolution of an aluminum particle layer that may occur due to the contact with an alkaline or acidic material for a long period of time while maintaining favorable recyclability.

Solution to Problem

One aspect of the present disclosure is a laminated film including a barrier layer and at least one adjacent layer that is adjacent to the barrier layer, in which the barrier layer has a barrier base material and a coat layer that is provided on one surface of the barrier base material so as to face the adjacent layer, the coat layer has an aluminum particle layer composed of aluminum particles and a loading material that is loaded into gaps in the aluminum particle layer, the loading material is a heated and dried product of a composition including a water-soluble polymer and at least one selected from the group consisting of a metal alkoxide, a silane coupling agent and hydrolysates thereof, and the barrier base material and the adjacent layer include the same resin.

According to the laminated film of the present disclosure, since the barrier base material and the adjacent layer include the same resin, favorable recyclability can be maintained. In addition, a packaging bag for which the laminated film of the present disclosure is used is capable of curbing dissolution of the aluminum particle layer that may occur due to the contact with an acidic or alkaline material (contents) for a long period of time.

The present inventors assumed the reason for dissolution of the aluminum particle layer being curbed as described below. That is, when the laminated film in which the barrier base material and the adjacent layer include the same resin and an acidic or alkaline material (contents) are in contact with each other for a long period of time, the contents infiltrate into the laminated film and eventually come into contact with the coat layer. At this time, if the coat layer is composed of the aluminum particle layer alone, the contents come into direct contact with the aluminum particle layer and dissolve the aluminum particle layer in some cases. Ordinarily, in a case where an aluminum particle layer is formed by a vapor deposition process, defects such as parts where aluminum atoms or crystal grains are dense or sparse or fine voids between crystal grains, which may be generated in the vapor deposition process of the aluminum particle layer, and, furthermore, fine cracks generated in the same manner in the vapor deposition process are generated. It is considered that these defects act as capillaries that diffuse a content component that has infiltrated into the laminated film in the aluminum particle layer and an increase in the contact area between aluminum and the content component causes and accelerates the dissolution phenomenon. Therefore, there are cases where the contents induce peeling in the interface between the aluminum particle layer and the barrier base material. In contrast, in the laminated film of the present disclosure, the coat layer is composed of the aluminum particle layer and the loading material that is loaded into gaps in the aluminum particle layer. In addition, the loading material is a heated and dried product of a composition including a water-soluble polymer and at least one selected from the group consisting of a metal alkoxide, a silane coupling agent and hydrolysates thereof. Therefore, the aluminum particle layer is protected from the contents by the loading material. Therefore, even when an acidic or alkaline material (contents) infiltrates into the laminated film and comes into contact with the coat layer, dissolution of the aluminum particle layer due to the material (contents) is curbed.

Another aspect of the present disclosure is a laminated film including a barrier layer and at least one adjacent layer that is adjacent to the barrier layer, in which the barrier layer has a barrier base material and a coat layer that is provided on one surface of the barrier base material so as to face the adjacent layer, the coat layer has an aluminum particle layer composed of aluminum particles and a resin composition that is loaded into gaps in the aluminum particle layer, and the barrier base material and the adjacent layer include the same resin.

In the laminated film of the present disclosure, the coat layer is composed of the aluminum particle layer and the resin composition that is loaded into gaps in the aluminum particle layer. Therefore, the aluminum particle layer is protected from contents by the resin composition. Therefore, even when an acidic or alkaline material (contents) infiltrates into the laminated film and comes into contact with the coat layer, dissolution of the aluminum particle layer due to the material (contents) is curbed.

In the laminated film, the resin composition may include a polyolefin resin modified by at least one compound selected from the group consisting of an unsaturated carboxylic acid, an ester thereof and an acid anhydride thereof.

In the laminated film, the coat layer may include a region that extends along a longitudinal direction of the coat layer and includes no aluminum particles.

In the laminated film, at least one adjacent layer may be a base material layer and a sealant layer that are provided on both sides of the barrier layer.

In the laminated film, the coat layer preferably has a thickness of 0.1 μm or more. This laminated film is capable of effectively curbing dissolution of the aluminum particle layer even when made to be in contact with an acidic or alkaline material (contents) for a long period of time.

In the laminated film, the barrier base material and the adjacent layer may include a polyester resin as the same resin, and a total mass of the polyester resin may be 90 mass % or more based on a total amount of the laminated film.

In the laminated film, the barrier base material and the adjacent layer may include a polyolefin resin as the same resin, and a total mass of the polyolefin resin may be 90 mass % or more based on a total amount of the laminated film.

In the laminated film, the barrier base material and the adjacent layer may include a polypropylene resin as the same resin, and a total mass of the polypropylene resin may be 90 mass % or more based on a total amount of the laminated film.

In the laminated film, the barrier base material and the adjacent layer may include a polyethylene resin as the same resin, and a total mass of the polyethylene resin may be 90 mass % or more based on a total amount of the laminated film.

The laminated film may have a water vapor permeability of 5 g/m$^2$·day or less.

The laminated film may have an oxygen permeability of 1 cc/m$^2$·day·atm or less.

In the laminated film, the barrier base material may include a polyester resin, and the polyester resin that is included in the barrier base material may have a mass-average molecular weight of 10,000 to 1,000,000.c Still another aspect of the present disclosure is a packaging bag formed using the above-described laminated film. According to the packaging bag of the present disclosure, since the barrier base material and the adjacent layer include the same resin in the laminated film, favorable recyclability can be maintained.

In addition, as already described, the laminated film is capable of curbing dissolution of the aluminum particle layer even when made to be in contact with an acidic or alkaline material for a long period of time.

Advantageous Effects of Invention

According to the present disclosure, a laminated film and a packaging bag capable of curbing dissolution of an aluminum particle layer that may occur due to the contact with an alkaline or acidic material for a long period of time while maintaining favorable recyclability are provided.

DESCRIPTION OF EMBODIMENTS

Figure 1:
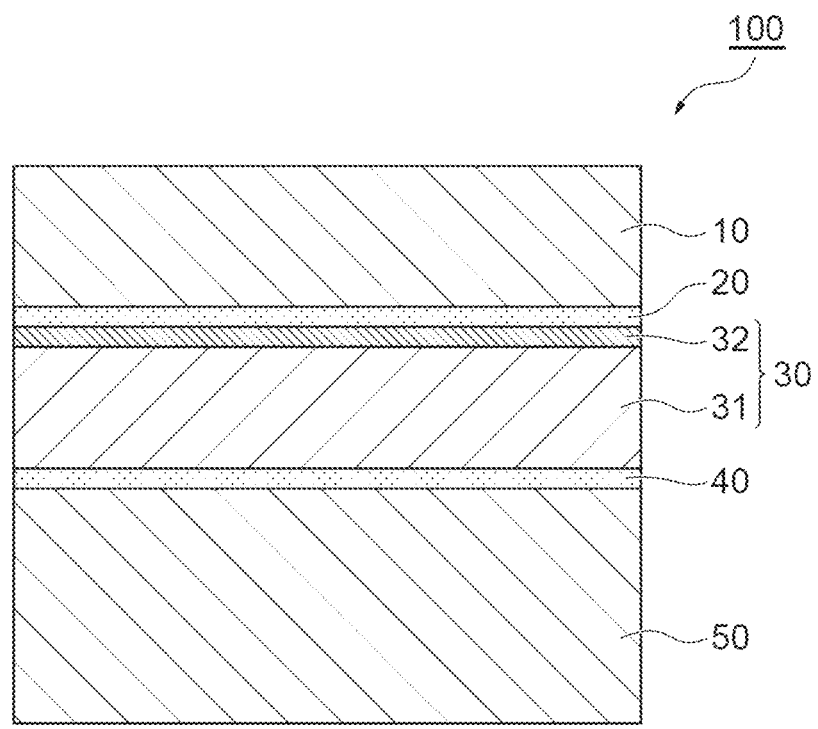
FIG. 1 is a cross-sectional view showing one embodiment of a laminated film of the present disclosure.

Hereinafter, an embodiment of the present disclosure will be described with reference to drawings in some cases. However, the following embodiment is an example for describing the present disclosure and does not purport to limit the present disclosure to the following contents. In description, the same reference sign will be used for the same element or elements having the same function, and duplicate description will not be made in some cases. In addition, dimensional ratios in the drawings are not limited to the ratios shown in the drawings.

<Laminated Film>

Figure 2:
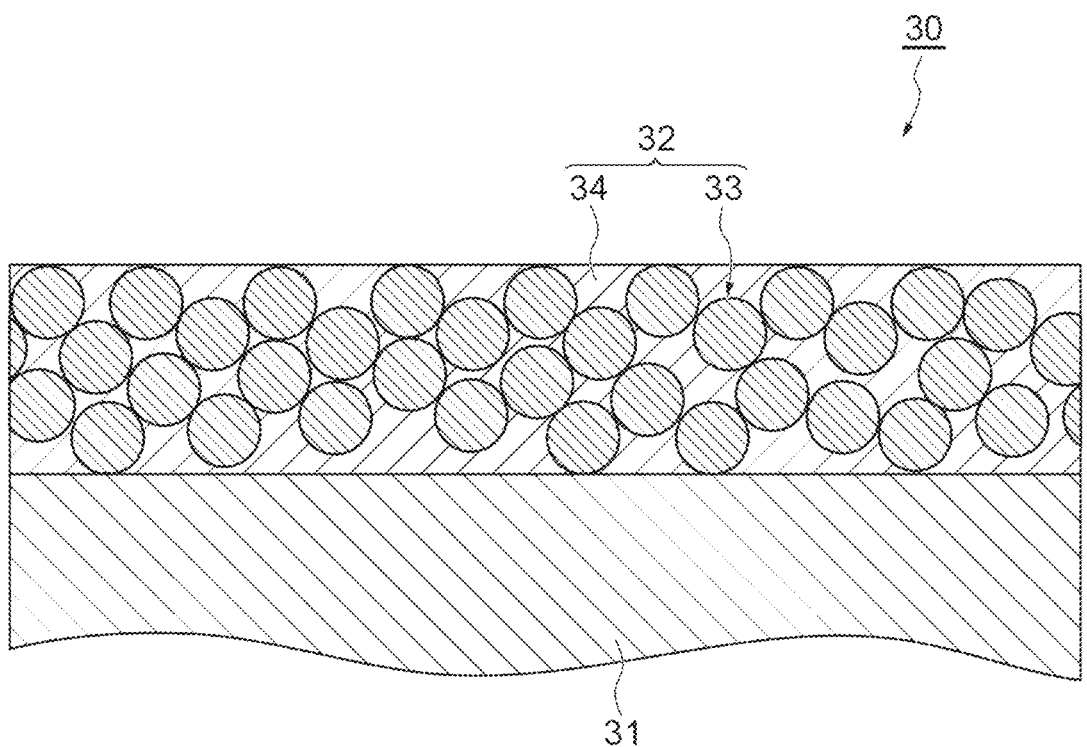
FIG. 2 is a partial cross-sectional view schematically showing a barrier layer in FIG. 1.
Figure 3:
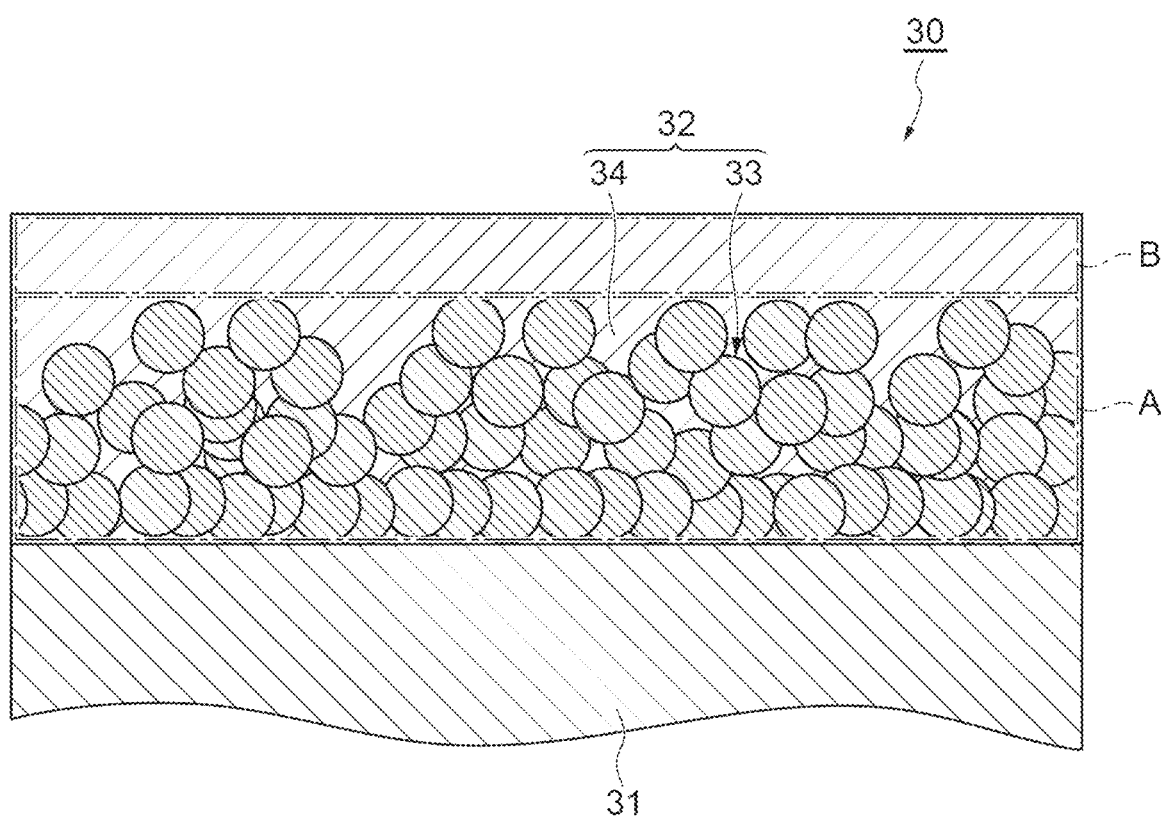
FIG. 3 is a partial cross-sectional view schematically showing the barrier layer in FIG. 1.

FIG. 1 is a cross-sectional view showing one embodiment of a laminated film of the present disclosure, and FIG. 2 and FIG. 3 are partial cross-sectional views schematically showing a barrier layer in FIG. 1. As shown in FIG. 1, FIG. 2 and FIG. 3, a laminated film 100 includes a base material layer 10 that is an adjacent layer, an adhesive layer 20, a barrier layer 30, an adhesive layer 40 and a sealant layer 50 that is an adjacent layer in this order. The barrier layer 30 has a barrier base material 31 and a coat layer 32 that is provided on a surface of the barrier base material 31 on a base material layer 10 side so as to face the base material layer 10. The coat layer 32 is composed of an aluminum particle layer 33 composed of aluminum particles and a loading material 34 that is loaded into gaps in the aluminum particle layer 33. The loading material 34 is a heated and dried product of a composition including a hydroxyl group-including polymer compound and at least one selected from the group consisting of a metal alkoxide, a silane coupling agent and hydrolysates thereof. In addition, the base material layer 10, the barrier base material 31 and the sealant layer 50 include the same resin. "The same resin" refers to a combination of polyolefin resins in the case of a polyolefin resin and to a combination of polyester resins in the case of a polyester resin. Examples of the polyolefin resin include a polypropylene resin and a polyethylene resin. Examples of the polyester resin include a polyethylene terephthalate resin, a polybutylene terephthalate resin and a copolymer polyester, which are based on a polyester. The same resin is preferably a combination of polyolefin resins or polyester resins. In a case where the same resin is a polyolefin resin, the same resin is preferably a combination of polypropylene resins or a combination of polyethylene resins. In a case where the same resin is a polyester resin, the same resin is preferably a combination of polyethylene terephthalate resins.

According to the laminated film 100, since the base material layer 10, the barrier base material 31 and the sealant layer 50 include the same resin, favorable recyclability can be maintained.

In addition, the laminated film 100 is capable of curbing dissolution of the aluminum particle layer 33 even when made to be in contact with an acidic or alkaline material for a long period of time.

Hereinafter, the laminated film 100 will be described in detail.

The total content rate of the same resin occupying the entire laminated film 100 is not particularly limited, but is preferably 90 mass % or more from the viewpoint of improving the recyclability of the laminated film 100. The total content rate of the same resin occupying the entire laminated film 100 is preferably 90 mass % or more and more preferably 95 mass % or more.

Here, the total content rate of the same resin occupying the entire laminated film 100 is normally less than 100 mass %.

(Base Material Layer)

The base material layer 10 may include the same resin as the resin that is included in the barrier base material 31 and the sealing layer 50. Examples of such a resin include a polyolefin resin and a polyester resin.

Examples of the polyolefin resin include polyethylenes such as low density polyethylene (LDPE), medium density polyethylene (MDPE), high density polyethylene (HDPE) and linear low density polyethylene (LLDPE); polypropylenes; ethylene-vinyl acetate copolymers, ionomer resins, ethylene-acrylic acid copolymers, ethylene-methyl acrylate copolymers, ethylene-methacrylic acid copolymers, ethylene-propylene copolymers and the like. These polyolefin resins may be each used singly or two or more thereof may be used in combination. As a method for combining two or more polyolefin resins, two or more types of polyolefin resins may be melted, blended and used or multilayers may be formed by multilayer co-extrusion film formation by inflation film formation or T-die film formation.

The density of LLDPE is normally 0.910 to 0.940 g/cm$^3$, and the density of HDPE is normally higher than 0.940 g/cm$^3$ and 0.980 g/cm$^3$ or lower.

Examples of the polyester resin include polyethylene terephthalate (PET), polyethylene naphthalate (PEN) and the like, and polyethylene terephthalate is preferable from the viewpoint of versatility and processing suitability. These polyester resins may be each used singly or two or more thereof may be used in combination. As a method for combining two or more polyester resins, two or more types of polyester resins may be melted, blended and used or multilayers may be formed by multilayer co-extrusion film formation by inflation film formation or T-die film formation.

The resin may be a resin that is obtained using a raw material (monomer) obtained from a fossil fuel or a resin that is obtained using a raw material (monomer) derived from biomass, but is preferably a resin that is obtained using a biomass-derived raw material from the viewpoint of reducing the environmental load. Alternatively, the resin may be a recycled resin. The recycled resin may be a mechanically recycled resin or a chemically recycled resin.

The thickness of the base material layer 10 is not particularly limited and may be, for example, 10 μm or more or 20 μm or more. The thickness of the base material layer 10 may be 40 μm or less or 25 μm or less. The thickness of the base material layer 10 is adjusted as appropriate depending on the use or desired characteristics.

The base material layer 10 may include at least one additive selected from a filler, an antistatic agent, a plasticizer, a lubricant, an antioxidant and the like as necessary.

The base material layer 10 may be configured by laminating a plurality of films of the same type. The base material layer 10 may be composed of any of stretched films and unstretched films. The base material layer may be a laminate of at least one stretched film and at least one unstretched film. The base material layer 10 has a biaxially arbitrarily stretched film and is thereby capable of improving the mechanical strength and the dimensional stability. In a case where the base material layer 10 is a laminate, the base material layer 10 may have a heat-resistant layer composed of a heat-resistant resin. The heat-resistant resin may be a resin having a higher melting point than resins that are used for layers of the base material layer 10 other than the heat-resistant layer and may be, for example, a resin having a melting point of 200° C. or higher. Alternatively, the resin may be a thermosetting resin, and, for example, a thermosetting coating film such as a urethane resin or an acrylic resin may be provided using a highly heat-resistant coating composition composed of a main agent and a curing agent. In addition, a matte-finished layer may be provided to suppress light reflection on the surface of the base material layer 10 or impart an anti-slip function.

(Adhesive Layer)

The adhesive layer 20 is a layer having a function of making the base material layer 10 and the barrier layer 30 adhere together, and the adhesive layer 40 is a layer having a function of making the barrier layer 30 and the sealant layer 50 adhere together. The laminated film 100 has the adhesive layer 20 and is thereby capable of further enhancing the adhesion between the base material layer 10 and the barrier layer 30. In addition, the laminated film 100 has the adhesive layer 40 and is thereby capable of further enhancing the adhesion between the barrier layer 30 and the sealant layer 50.

The adhesive layers 20 and 40 are composed of, for example, a polyolefin-based resin. Specific examples of such a polyolefin-based resin include a high density polyethylene resin (HDPE), a medium density polyethylene resin (MDPE), LDPE, LLDPE, an ethylene-methacrylic acid copolymer (EMAA), an ethylene-acrylic acid copolymer (EAA), an ionomer, polypropylene (PP), acid-modified polyethylene, acid-modified polypropylene and the like. In a case where the polyolefin-based resin includes a resin other than a polyethylene resin, it is desirable to curb the resin to 10 mass % or less with respect to the entire polyolefin-based resin. In a case where the adhesive layers 20 and 40 are composed of a polyolefin resin, the adhesive layers may be laminated by an extrusion lamination method. In addition, a coating composition is adjusted by dissolving or dispersing the polyolefin resin in a solvent and blending a curing agent or an additive thereto as necessary, and this coating composition may be laminated on the base material layer, the barrier layer and the sealant layer by a well-known coating method. In order to increase the adhesive strength, a corona treatment, an ozone treatment, anchor coating or the like may be performed on the surfaces of the base material layer 10, the barrier layer 30 and the sealant layer 50. The thicknesses of the adhesive layers 20 and 40 are not particularly limited, but are preferably 2 μm or more and 50 μm or less. When the thicknesses of the adhesive layers 20 and 40 are set to 2 μm or more, a sufficient adhesive strength can be obtained.

The adhesive layers 20 and 40 may be adhesive layers for which an adhesive composition including a dry laminating adhesive or the like is used instead of layers composed of a polyolefin-based resin.

Examples of the dry laminating adhesive include well-known adhesives such as a urethane-based adhesive, a polyester-based adhesive, a polyamide-based adhesive, an epoxy-based adhesive and an isocyanate-based adhesive. Among these, a urethane-based adhesive is preferable from the viewpoint of improving the handleability.

In addition, the adhesive layers 20 and 40 may or may not include a biomass component, but preferably includes a biomass component from the viewpoint of reducing the environmental load. Specific examples of the biomass component include "DIC DRY BM series" manufactured by DIC Corporation and "ECOAD series" manufactured by Toyo Ink Co., Ltd. The biomass component may be included as a polyolefin-based resin or a component other than the polyolefin-based resin or as an adhesive or a component other than the adhesive. Alternatively, the biomass component may be included as a polyolefin-based resin and a component other than the polyolefin-based resin or as an adhesive and a component other than the adhesive.

The adhesive composition may be an adhesive composition further including an organic solvent or an adhesive composition including no organic solvents, but is preferably an adhesive composition including no organic solvents (solventless adhesive composition) from the viewpoint of reducing the environmental load. As the adhesive composition, a barrier adhesive having oxygen barrier properties may be used. Specific examples thereof include "PASLIM" manufactured by DIC Corporation, "MAXIVE" manufactured by Mitsubishi Gas Chemical Company, Inc.

The thicknesses of the adhesive layers 20 and 40 are not particularly limited, but are preferably 1 to 5 μm and more preferably 2 to 3 μm from the viewpoint of curbing the laminated film 100 becoming too thick while curbing peeling between the base material layer 10 and the barrier layer 30 or between the barrier layer 30 and the sealant layer 50.

(Barrier Layer)

The barrier layer 30 is a layer having barrier properties with respect to gases such as oxygen and water vapor. The barrier base material 31 needs to include the same resin as the resin that is included in the base material layer 10 and the sealant layer 50. For example, in a case where the base material layer 10 and the sealant layer 50 include a polyester resin, the barrier base material 31 also needs to include a polyester resin. Therefore, for example, in a case where the polyester resin that is included in the base material layer 10 and the sealant layer 50 is polyethylene terephthalate, the polyester resin that is included in the barrier base material 31 may be polyethylene terephthalate or may be polyethylene naphthalate. Among monomer components configuring the polyester resin, the proportion of ethylene terephthalate and ethylene naphthalate may be 80 mol % or more.

The mass-average molecular weight of the resin that is included in the barrier layer 30 is preferably 10,000 to 1,000,000, more preferably 50,000 to 500,000 and still more preferably 150,000 to 500,000 since there is a tendency that dissolution of the aluminum particle layer 33 can be further curbed.

In a case where the polyester resin that is included in the base material layer 10 is biaxially stretched polyethylene terephthalate, the polyester resin that is included in the barrier base material 31 is also preferably biaxially stretched polyethylene terephthalate. In this case, it is possible to curb the curving of at least one of the base material layer 10 and the barrier base material 31, which makes the base material layer 10 peel off from the barrier layer 30 or makes the barrier layer 30 peel from the sealant layer 50.

The thickness of the barrier base material 31 is adjusted as appropriate depending on the material of the barrier base material 31 and the use of the laminated film 100.

The aluminum particle layer 33 that is included in the coat layer 32 is composed of an aggregate of aluminum particles, and the aluminum particles may be in contact with one another. The aluminum particle may be a deposit of an aluminum atom or a crystal grain that is formed by the crystal growth of an aluminum atom. The aluminum particle layer 33 is obtained by vapor-depositing aluminum onto one surface of the barrier base material 31. Gaps in the aluminum particle layer 33 are defects such as parts where aluminum atoms or crystal grains are dense or sparse or fine voids between crystal grains, which may be generated in the vapor deposition process of the aluminum particle layer, and, furthermore, fine cracks generated in the same manner in the vapor deposition process and may be gaps between an aluminum atom and an aluminum atom or gaps between a crystal grain and a crystal grain.

The loading material 34 that is loaded into the gaps in the aluminum particle layer 33 is a heated and dried product of a composition including a hydroxyl group-including polymer compound and at least one selected from the group consisting of a metal alkoxide, a silane coupling agent and hydrolysates thereof (hereinafter, also referred to as the composition for forming the loading material).

The density of the aluminum particles may decrease from the barrier base material 31 side toward the adhesive layer 20 side as shown in FIG. 3. The coat layer 32 may include a region A that extends along the longitudinal direction and includes the aluminum particles and a region B that extends along the longitudinal direction and includes no aluminum particles. The coat layer 32 may not include the region B. The coat layer 32 preferably includes the region B since dissolution of the aluminum particle layer can be further curbed.

The composition for forming the loading material can be prepared by, for example, mixing a solution obtained by dissolving a hydroxyl group-including polymer compound, which is a water-soluble polymer, in a water-based (water or water and alcohol-mixed) solvent directly with a metal alkoxide and/or a silane coupling agent or with a product obtained by performing a treatment such as hydrolysis on a metal alkoxide and a silane coupling agent in advance.

Examples of the hydroxyl group-including polymer compound include polyvinyl alcohol, an ethylene-vinyl alcohol copolymer, starch, methyl cellulose, carboxymethyl cellulose, sodium alginate and the like. Among these, polyvinyl alcohol (PVA) is preferably used for the composition for forming the loading material since the gas barrier properties are particularly excellent.

As the metal alkoxide, a compound represented by the following general formula (I) can be exemplified.

$$M(OR^1)_m(R^2)_{n-m} \quad (I)$$

In the general formula (I), $R^1$ and $R^2$ are each independently a monovalent organic group having 1 to 8 carbon atoms and are preferably alkyl groups such as methyl groups or ethyl groups. M represents an n-valent metallic atom of Si, Ti, Al, Zr or the like. m is an integer of 1 to n. In a case where there are a plurality of $R^1$'s and a plurality of $R^2$'s, $R^1$'s and $R^2$'s may be the same as or different from each other.

Specific examples of the metal alkoxide include tetraethoxysilane [Si(OC$_2$H$_5$)$_4$], aluminum triisopropoxy [Al(O-2'-C$_3$H$_7$)$_3$] and the like. Tetraethoxysilane and aluminum triisopropoxy are relatively stable in water-based solvents after being hydrolyzed and are thus preferable.

As the silane coupling agent, a compound represented by the following general formula (II) can be exemplified.

$$Si(OR^{11})_p(R^{12})_{3-p}R^{13} \quad (II)$$

In the general formula (II), $R^{11}$ represents an alkyl group such as a methyl group or an ethyl group, $R^{12}$ represents a monovalent organic group such as an alkyl group having an alkyl group, an aralkyl group, an aryl group, an alkenyl group or an acryloxy group as a substituent or an alkyl group having a methacryloxy group as a substituent, $R^{13}$ represents a monovalent organic functional group, and p represents an integer of 1 to 3. In a case where there are a plurality of $R^{11}$'s and a plurality of $R^{12}$'s, $R^{11}$'s and $R^{12}$'s may be the same as or different from each other. Examples of the monovalent organic functional group represented by $R^{13}$ include monovalent organic functional groups including a glycidyloxy group, an epoxy group, a mercapto group, a hydroxyl group, an amino group, an alkyl group having a halogen atom as a substituent or an isocyanate group, Specific examples of the silane coupling agent include silane coupling agents such as vinyltrimethoxysilane, γ-chloropropylmethyldimethoxysilane, γ-chloropropyltrimethoxysilane, glycidoxypropyltrimethoxysilane, γ-methacryloxypropyltrimethoxysilane and γ-methacryloxypropylmethyldimethoxysilane.

In addition, the silane coupling agent may be a multimer obtained by polymerizing the compound represented by the general formula (II). The multimer is preferably a trimer and more preferably 1,3,5-tris(3-trialkoxysilylalkyl)isocyanurate. This is a condensation polymer of 3-isocyanate alkyl alkoxy silane. It is known that this 1,3,5-tris(3-trialkoxysilylalkyl)isocyanurate has no chemical reactivity in the isocya portion, but has more reactivity secured for the polarity of the nurate portion. Ordinarily, 1,3,5-tris(3-trialkoxysilylalkyl)isocyanurate is added to an adhesive or the like together with 3-isocyanate alkyl alkoxy silane at the same time and is known as an adhesiveness improver. Therefore, when 1,3,5-tris(3-trialkoxysilylalkyl)isocyanurate is added to the hydroxyl group-including polymer compound, the water resistance of a gas barrier property coating layer can be improved by a hydrogen bond. While 3-isocyanate alkyl alkoxy silane is highly reactive and poorly stable in liquid, 1,3,5-tris(3-trialkoxysilylalkyl)isocyanurate is not water-soluble in the nurate portion due to the polarity, but easily disperses in water-based solutions and is capable of stably holding the liquid viscosity. In addition, 3-isocyanate alkyl alkoxy silane and 1,3,5-tris(3-trialkoxysilylalkyl)isocyanurate are equivalent to each other in terms of water-resistant performance.

1,3,5-Tris (3-trialkoxysilylalkyl)isocyanurate is produced by the thermal condensation of 3-isocyanate propyl alkoxy silane and includes 3-isocyanate propyl alkoxy silane, which is a raw material, in some cases, which does not cause any particular problems. Furthermore, 1,3,5-tris(3-trialkoxysilylpropyl)isocyanurate is preferable, and 1,3,5-tris(3-trimethoxysilylpropyl)isocyanurate is more preferable. Since this methoxy group has a high hydrolysis rate, and 1,3,5-tris(3-trialkoxysilylalkyl)isocyanurate including a propyl group can be procured at a relatively low cost, 1,3,5-tris(3-trimethoxysilylpropyl)isocyanurate is practically advantageous.

The amount of the metal alkoxide in the composition for forming the loading material can be set to 1 to 4 parts by mass and may be 2 to 3 parts by mass with respect to 1 part by mass of the hydroxyl group-including polymer compound from the viewpoint of fragrance permeation-curbing properties, adhesion to inorganic vapor-deposited layers and gas barrier property maintenance. Similarly, the amount of the silane coupling agent can be set to 0.01 to 1 part by mass and may be 0.1 to 0.5 parts by mass with respect to 1 part by mass of the hydroxyl group-including polymer compound. In a case where a silane compound (alkoxysilane) is used as the metal alkoxide, the amount of the silane compound (the metal alkoxide and the silane coupling agent) in the composition for forming the loading material can be set to 1 to 4 parts by mass and may be 2 to 3 parts by mass with respect to 1 part by mass of the hydroxyl group-including polymer compound.

To the composition for forming the loading material, it is also possible to add an isocyanate compound or a well-known additive such as a dispersant, a stabilizer, a viscosity modifier or a colorant as necessary to an extent that the gas barrier properties are not impaired.

The composition for forming the loading material can be applied by, for example, a dipping method, a roll coating method, a gravure coating method, a reverse gravure coating method, an air knife coating method, a comma coating method, a die coating method, a screen printing method, a spray coating method or a gravure offset method. A coated film formed by the application of the composition for forming the loading material can be dried by, for example, a hot air drying method, a hot roll drying method, a high frequency irradiation method, an infrared irradiation method, a UV irradiation method or a combination thereof.

The temperature at the time of drying the coated film can be set to, for example, a temperature of 50° C. to 150° C. and is preferably set to 70° C. to 100° C. When the temperature during the drying is set within the above-described range, it is possible to further curb the generation of cracks in the loading material 34 and to develop excellent barrier properties.

The loading material 34 may be formed using a composition for forming the loading material including a hydroxyl group-including polymer compound (for example, a polyvinyl alcohol-based resin) and a silane compound. To the composition for forming the loading material, an acid catalyst, an alkali catalyst, a photopolymerization initiator or the like may be added as necessary.

Examples of the silane compound include a silane coupling agent, polysilane, siloxane and the like, and specific examples thereof include tetramethoxysilane, tetraethoxysilane, glycidoxypropyltrimethoxysilane, acryloxypropyltrimethoxysilane, hexamethyldisilazane and the like.

The thickness of the coat layer 32 is not particularly limited, but is preferably 0.1 μm or more, more preferably more than 1 μm, still more preferably more than 2 μm and particularly preferably 5 μm or more. When the thickness of the coat layer 32 is 0.1 μm or more, the laminated film 100 is capable of effectively curbing the deterioration of adhesion between the barrier layer and the base material layer or the sealant layer even when made to be in contact with an acidic or alkaline material for a long period of time.

The barrier layer 30 may further include a hydroxyl group-including resin layer between the barrier base material 31 and the coat layer 32. In this case, it becomes possible for a hydroxyl group in the hydroxyl group-including resin layer and the aluminum particle layer 33 in the coat layer 32 to strongly bond to each other. In addition, it also becomes possible for a hydroxyl group in the hydroxyl group-including resin layer and the loading material 34 in the coat layer 32 to strongly bond to each other. Therefore, the coat layer 32 peeling off from the barrier base material 31 is sufficiently curbed.

The hydroxyl group-including resin layer includes a hydroxyl group-including polymer compound. As the hydroxyl group-including polymer compound, the same polymer compound that is used to form the loading material 34 can be used.

The thickness of the hydroxyl group-including resin layer is not particularly limited, but is preferably 1 μm or more and more preferably 1.5 μm or more from the viewpoint of improving film formability and barrier properties. The thickness of the hydroxyl group-including resin layer is preferably 5 μm or less and more preferably 3 μm or less from the viewpoint of improving adhesion.

(Sealant Layer)

The sealant layer 50 may include the same resin as the resin that is included in the base material layer 10 and the barrier base material 31. Examples of such a resin include a polyolefin resin and a polyester resin. As the polyolefin resin and the polyester resin, the same polyolefin resin and polyester resin that are used in the base material layer 10 can be used. Therefore, for example, in a case where the base material layer 10 and the barrier base material 31 include a polyester resin, the sealant layer 50 also needs to include a polyester resin. For example, in a case where the polyester resin that is included in the base material layer 10 and the barrier base material 31 is polyethylene terephthalate, the polyester resin that is included in the barrier base material 31 may be polyethylene terephthalate or may be polyethylene naphthalate.

The sealant layer 50 preferably has a lower melting point than the melting points of the base material layer 10 and the barrier base material 31 from the viewpoint of improving heat sealability.

The sealant layer 50 can be formed by, for example, pasting a sheet including a polyester resin to the adhesive layer 40.

The thickness of the sealant layer 50 is not particularly limited and may be, for example, 10 μm or more and may be 50 μm or more.

The thickness of the sealant layer 50 may be 200 μm or less and may be 100 μm or less.

To the sealant layer 50, a colorant may be added as necessary.

The laminated film 100 may further include a printing layer as necessary.

The printing layer is a layer that is formed using ink obtained by adding a variety of pigments, a plasticizer, a desiccant, a stabilizer or the like to a binder resin such as a urethane-based resin, an acrylic resin, a nitrocellulose-based resin or a rubber-based resin. This printing layer makes it possible to display letters, patterns or the like.

The ink may be aqueous ink or oily ink, but is preferably aqueous ink. Aqueous ink is capable of further reducing the environmental load since water or an alcohol is used as a solvent. Particularly, in a case where the adhesive composition is a solventless adhesive composition, the use of aqueous ink as the ink makes it possible to significantly reduce the environmental load. In addition, the ink may or may not be biomass ink but is preferably biomass ink from the viewpoint of reducing the environmental load. Here, the biomass ink refers to ink including a component obtained from a source derived from organism (biomass) such as cotton, pulp, rice bran, vegetable oil or angiosperm seeds.

As a printing method, for example, a well-known printing method such as offset printing, gravure printing, flexographic printing, silk screen printing or inkjet printing can be used. The printing method is preferably flexographic printing. In addition, when a corona treatment or an ozone treatment is performed in advance as a pretreatment on the surface of the sealant layer 50, it is possible to improve the adhesion of the printing layer to the sealant layer 50.

The water vapor permeability of the laminated film 100 can be set to 5 $g/m^2 \cdot day$ or less. In addition, the oxygen permeability of the laminate can be set to 1 $cc/m^2 \cdot day \cdot atm$ or less. This makes it easy to protect contents from deterioration due to water vapor or oxygen and to hold the quality for a long period of time. From this viewpoint, the water vapor permeability may be 1 $g/m^2 \cdot day$ or less or 0.5 $g/m^2 \cdot day$ or less. In addition, the oxygen permeability of the laminate may be 0.5 $cc/m^2 \cdot day \cdot atm$ or less or 0.2 $cc/m^2 \cdot day \cdot atm$ or less. The oxygen permeability is measured based on JIS K 7126-2. The water vapor permeability is measured based on JIS K 7129B.

<Packaging Body>

Figure 4:
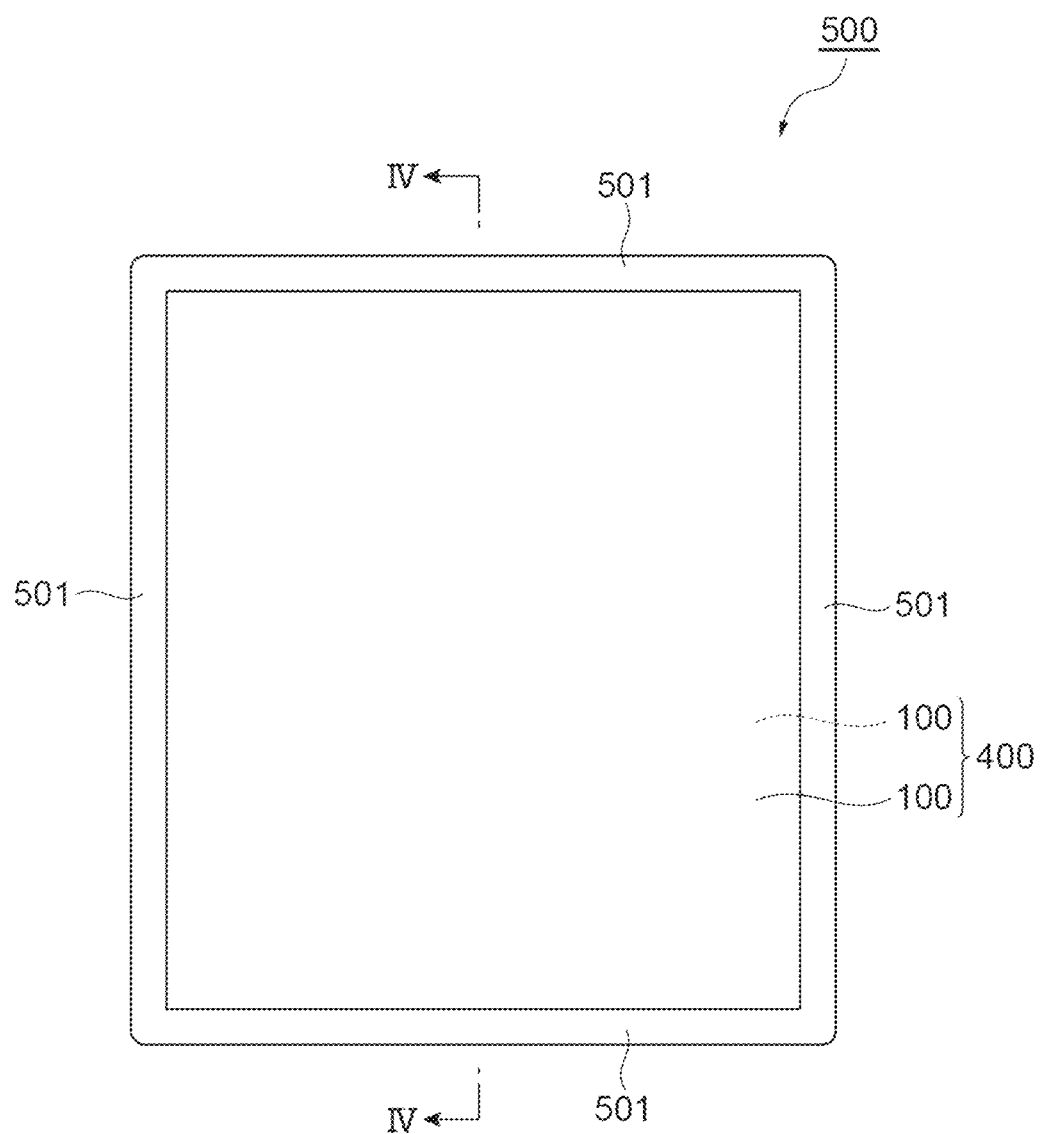
FIG. 4 is a front view showing one embodiment of a packaging body of the present disclosure.

Next, an embodiment of a packaging body of the present disclosure will be described with reference to FIG. 4 and FIG. 5. FIG. 4 is a front view showing one embodiment of the packaging body of the present disclosure, and FIG. 5 is a cross-sectional view along a line IV-IV in FIG. 4.

Figure 5:
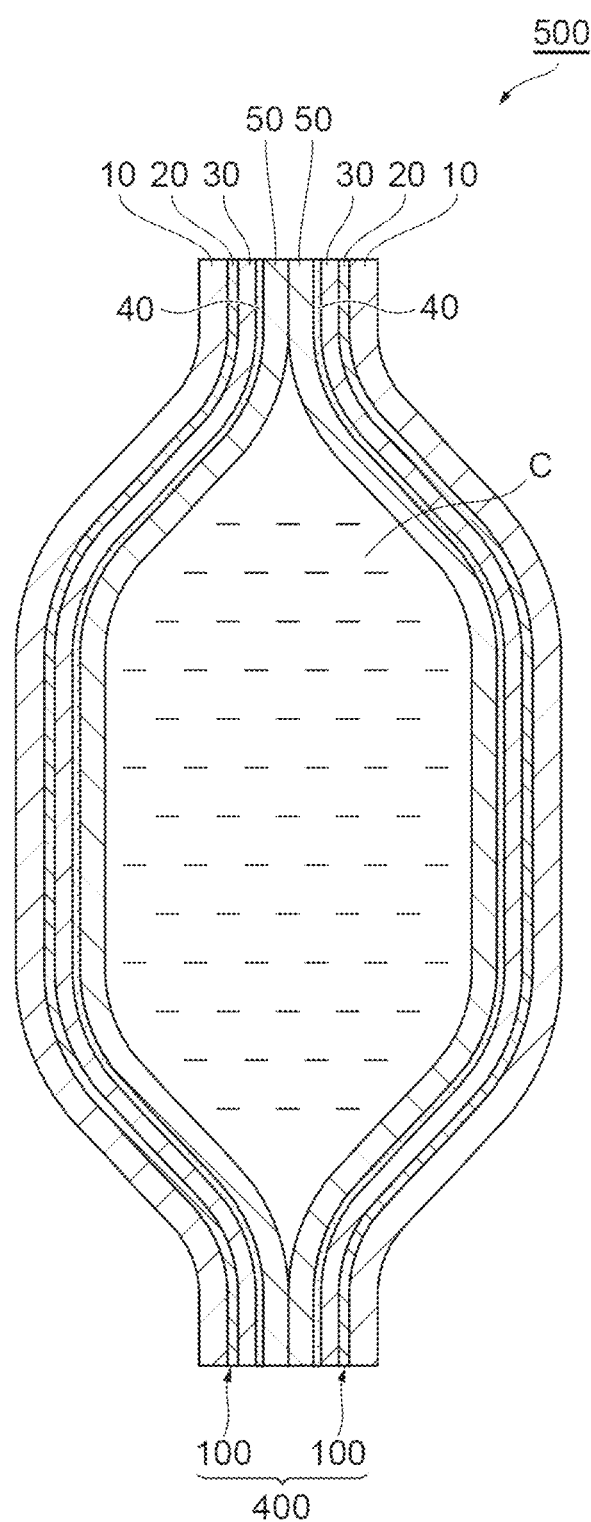
FIG. 5 is a cross-sectional view along a line IV-IV in FIG. 4.

As shown in FIG. 4 and FIG. 5, a packaging body 500 includes a packaging bag 400 and a content C that is accommodated in the packaging bag 400. The packaging bag 400 is formed using one pair of laminated films 100. Here, the sealant layer 50 of the laminated film 100 faces inward, and the base material layer 10 faces outward. The packaging bag 400 is composed of an accommodation part that accommodates the content C and an adhesive part 501 that is provided at the surround of the accommodation part. The adhesive part 501 is a part that has been made to adhere to the facing sealant layer 50 of the laminated film 100, and the accommodation part is a part that is not made to adhere to the facing sealant layer 50 of the laminated film 100.

According to the packaging body 500, since the base material layer 10, the barrier base material 31 and the sealant layer 50 include the same resin in the laminated film 100 configuring the packaging bag 400, favorable recyclability can be maintained.

In addition, as previously described, the laminated film 100 is capable of curbing dissolution of the aluminum particle layer 33 even when made to be in contact with an acidic or alkaline material for a long period of time. Therefore, according to the packaging body 500, it is possible to curb dissolution of the aluminum particle layer 33 even when the laminated film 100 is made to be in contact with the content C including an acidic or alkaline material for a long period of time.

(Content)

The content C is not particularly limited and needs to be selected as appropriate depending on the use of the packaging bag 400. However, the packaging body 500 is particularly effective in a case where the content C is made of an acidic or alkaline material. Examples of such a content C include toiletry products, dry flowers, fragrances, cosmetics and food.

(Packaging Bag)

The one pair of laminated films 100 configuring the packaging bag 400 do not necessarily include the same layer configuration and may have a different layer configuration.

The packaging bag 400 may include a half-cut line and may further include an easy open-processed part at both ends or one end of the half-cut line. Examples of the easy open-processed part include a group of marks and V-like, U-like or I-like notches.

In the adhesive part 501 of the packaging bag 400, both sealant layers 50 of the one pair of laminated films 100 may be made to directly adhere together by heat welding (refer to FIG. 5) or may be made to adhere together with an adhesive.

(Method for Manufacturing Packaging Body)

Next, a method for manufacturing the packaging body 500 using the laminated film 100 will be described.

First, a pair of the laminated films 100 are prepared. In addition, a laminate is prepared by making the sealant layers 50 of the pair of laminated films 100 face to each other, and the sealant layers 50 are made to adhere together. At this time, the adhesive part 501 is formed by making some of the peripheral part of the laminate adhere in a reversed C shape, and a part where the sealant layers are not made to adhere together (non-adhesive part) is formed. A packaging bag having a non-adhesive part is obtained as described above.

Next, the content C is loaded through the non-adhesive part of the packaging bag having the non-adhesive part. After that, the sealant layers 50 of the laminated films 100 are made to adhere together in the non-adhesive part to make the non-adhesive part into the adhesive part 501 as well. The packaging body 500 including the packaging bag 400 and the content C accommodated therein can be manufactured as described above.

Hitherto, the suitable embodiment of the present disclosure has been described, but the present disclosure is not limited to the embodiment. For example, the loading material 34 may be a heated and dried product of a composition including a water-soluble polymer and at least one selected from the group consisting of a metal alkoxide, a silane coupling agent and hydrolysates thereof. The water-soluble polymer that is included in the composition may not necessarily have a hydroxyl group, and examples thereof include polyvinyl pyrrolidone, methyl cellulose in which hydroxyl groups all have been substituted with methyl groups and carboxymethyl cellulose in which hydroxyl groups all have been substituted with carboxymethyl groups.

In a case where the loading material 34 is a heated and dried product of a composition including a water-soluble polymer and at least one selected from the group consisting of a metal alkoxide, a silane coupling agent and hydrolysates thereof, the barrier layer 30 may further include a water-soluble polymer resin layer between the barrier base material 31 and the coat layer 32. The water-soluble polymer resin layer may be a heated and dried product of a composition including a water-soluble polymer and at least one selected from the group consisting of a metal alkoxide, a silane coupling agent and hydrolysates thereof.

In addition, the loading material 34 is a heated and dried product of the composition for forming the loading material in the embodiment, but the loading material 34 may be, for example, a resin composition.

As an example of the resin composition, a polyolefin resin can be exemplified. The polyolefin resin further curbs dissolution of the aluminum particle layer and is thus preferably a polyolefin resin modified from at least one compound selected from the group consisting of an unsaturated carboxylic acid, an ester thereof and an acid anhydride thereof (hereinafter, also referred to as "polyolefin copolymer resin"). The polyolefin copolymer resin is a copolymer of monomers including an olefin such as ethylene and an unsaturated carboxylic acid, an ester thereof and an anhydride thereof. In other words, the polyolefin copolymer resin is a copolymer including a configuration unit derived from an olefin such as ethylene and a configuration unit derived from an unsaturated carboxylic acid, an ester thereof and an anhydride thereof Examples of the unsaturated carboxylic acid include unsaturated monocarboxylic acids, unsaturated dicarboxylic acids and unsaturated tricarboxylic acids. Examples of the unsaturated monocarboxylic acids include acrylic acid and methacrylic acid. Examples of the unsaturated dicarboxylic acids include maleic acid and fumaric acid. Examples of the unsaturated tricarboxylic acids include aconitic acid. Examples of the ester of the unsaturated carboxylic acid include acrylic acid esters, methacrylic acid esters and glycerin unsaturated fatty acid esters. The glycerin unsaturated fatty acid esters may be epoxidized vegetable oils obtained by epoxidizing the unsaturated part. Examples of the acid anhydride of the unsaturated carboxylic acid include maleic anhydride.

Examples of a method for modifying the polyolefin resin include a method in which, in the polymerization stage of the polyolefin resin, compounds thereof are used as comonomers and copolymerized in the main chain and a method in which a peroxide is grafted onto a side chain of the polyolefin resin by a graft reaction in an environment such as in the presence of the peroxide. The polyolefin resin may be modified with other compounds aside from the unsaturated carboxylic acid, the ester thereof and the acid anhydride thereof. Examples of such compounds include compounds having a variety of functional groups such as a hydroxyl group and an amino group.

The content rate of the unsaturated carboxylic acid, the ester thereof and the acid anhydride thereof in the polyolefin copolymer resin is not particularly limited, but is preferably 0.01 to 5 mass % and more preferably 1 to 4 mass %. When the content rate is 0.01 mass % or more, the adhesiveness of the polyolefin copolymer resin to the aluminum particles can be guaranteed.

As the olefin of the polyolefin copolymer resin, ethylene may be used singly, propylene may be used singly or ethylene and propylene may be jointly used.

Figure 6:
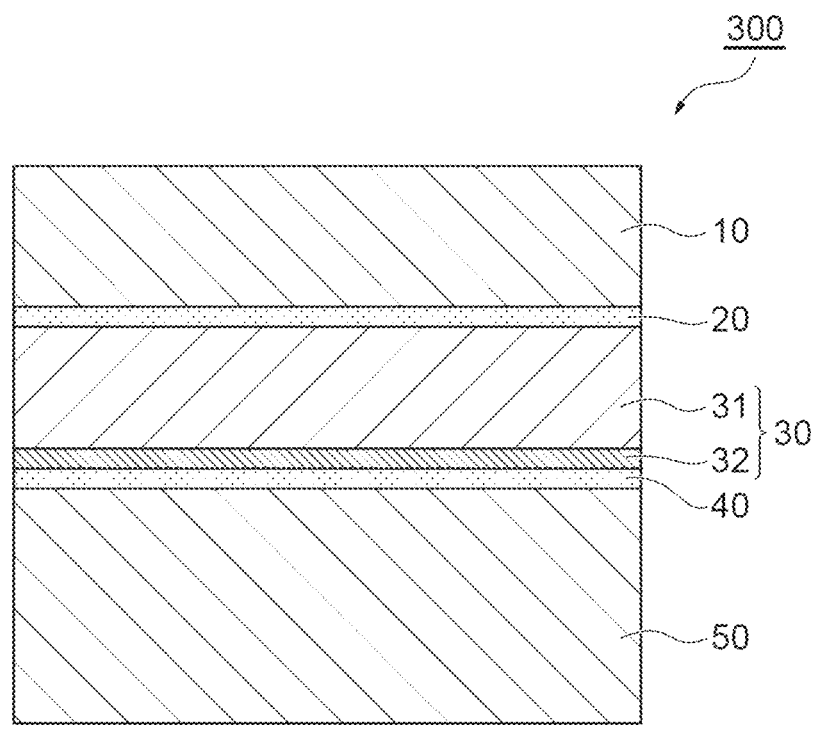
FIG. 6 is a cross-sectional view showing another embodiment of the laminated film of the present disclosure.

In addition, in the embodiment, the coat layer 32 is provided on the base material layer 10 side of the barrier base material 31 in the barrier layer 30, but the coat layer 32 may be provided on the sealant layer 50 side of the barrier base material 31 in the barrier layer 30 as in a laminated film 300 shown in FIG. 6.

Figure 7:
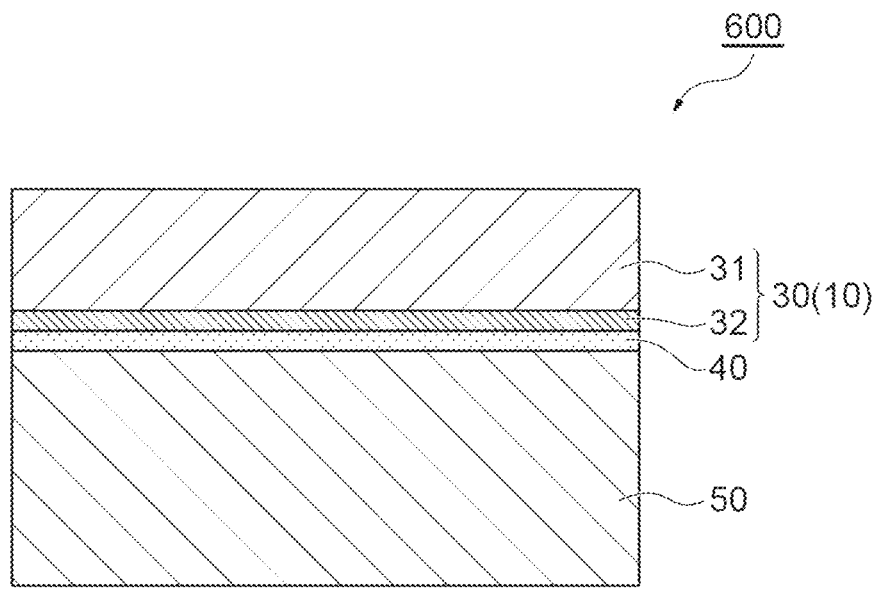
FIG. 7 is a cross-sectional view showing still another embodiment of the laminated film of the present disclosure.

In the embodiment, the laminated film 100 separately has the base material layer 10 and the barrier layer 30, but the barrier layer 30 may also function as the base material layer 10 as in a laminated film 600 shown in FIG. 7. In this case, the sealant layer 50 serves as an adjacent layer. In addition, in the laminated film 600 shown in FIG. 7, the coat layer 32 may be provided on the sealant layer 50 side of the barrier base material 31 in the barrier layer 30 as in the laminated film 300 shown in FIG. 6.

Figure 8:
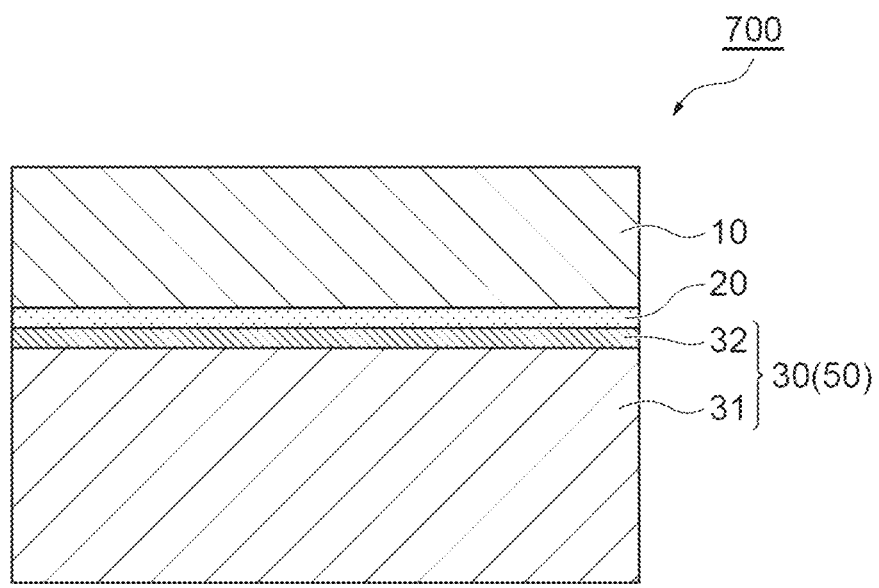
FIG. 8 is a cross-sectional view showing far still another embodiment of the laminated film of the present disclosure.

Furthermore, in the embodiment, the laminated film 100 separately has the barrier layer 30 and the sealant layer 50, but the barrier layer 30 may also function as the sealant layer 50 as in a laminated film 700 shown in FIG. 8. In this case, the base material layer 10 serves as an adjacent layer.

In addition, in the embodiment, the laminated films 100 and 300 include the adhesive layer 20, but it is also possible to make the base material layer 10 and the barrier layer 30 directly adhere together without providing the adhesive layer 20. In addition, in the present embodiment, the laminated films 100 and 300 include the adhesive layer 40, but it is also possible to make the barrier layer 30 and the sealant layer 50 directly adhere together without providing the adhesive layer 40.

In the embodiment, the shape of the packaging bag 400 is not limited to a square bag as shown in FIG. 4 and may be a packaging bag having a standing pouch shape, a two-sided bag, a three-sided bag, a gassho bag or a gusset bag. The shape of the packaging bag 400 may be a sachet (small flat pouch) or a laminate tube. The packaging bag 400 may include a tap or a synthetic resin fastener in which a band-like projection parts and a band-like groove parts fit together to enable contents to be repeatedly sealed.

Furthermore, in the present embodiment, the packaging bag 400 is formed using one pair of laminated films 100, but the laminated film 300 may be used instead of the laminated film 100. In addition, a packaging bag may be manufactured by folding the one laminated film 100 or 300 with the sealant layer 50 face inward and making the overlapping peripheral parts adhere together.

EXAMPLES

The contents of the present disclosure will be described in more detail with reference to examples and comparative examples, but the present disclosure is not limited to the following examples.

<Adjustment of Composition for Forming Loading Material>

A first composition for forming a loading material was prepared by mixing the following liquid A and liquid B in a mass ratio of 70/30 (liquid A/liquid B).

Liquid A: A hydrolysis solution having a solid content of 5 mass % (in terms of $SiO_2$) obtained by adding 72.1 g of 0.1N hydrochloric acid to 17.9 g of tetrahydrofuran (Si$(OC_2H_5)_4$) and 10 g of methanol and hydrolyzing the components by 30 minutes of stirring.

Liquid B: A 5 mass % water/methanol solution (the mass ratio between water and methanol was 95:5) of polyvinyl alcohol.

A resin composition composed of a polyolefin copolymer resin emulsion including particles composed of a polyolefin copolymer resin (a copolymer of an unsaturated carboxylic acid or an anhydride thereof and an ethylene-based hydrocarbon) (manufactured by Unitika Ltd., trade name: ARROWBASE SD5200, number-average particle diameter of particles: 1 μm or less, hereinafter "first resin composition") was prepared.

<Manufacturing of Laminated Film>

Example 1-1

A silica vapor-deposited PET film (base material thickness: 12 μm) was prepared as a base material layer.

On the other hand, a VM-PET film obtained by forming an aluminum particle layer (aluminum vapor-deposited layer) on a PET film by vapor deposition (manufactured by Toray International, Inc., trade name: BR-PET1312, base material thickness: 12 μm, the mass-average molecular weight of a resin configuring the base material: approximately 200,000) was prepared, the first composition for forming a loading material was applied onto the aluminum particle layer of the VM-PET film, heated and dried at 60° C. for one minute to form a coat layer having a thickness of 0.5 μm, thereby producing a barrier layer.

In addition, a urethane-based adhesive (manufactured by Mitsui Chemicals, Inc., trade name: A626/A50) was applied onto the silica vapor deposition formed surface of the base material layer using a dry laminator, and the barrier layer obtained as described above was pasted thereto with the coat layer facing the base material layer, thereby obtaining a laminate. Subsequently, a urethane-based adhesive (manufactured by Mitsui Chemicals, Inc., trade name: A626/A50) was applied onto the surface of the barrier base material of the laminate using the dry laminator, and a sealant layer composed of a HS-PET film (manufactured by Toyobo Co., Ltd., trade name: DE046, thickness: 30 μm) was pasted thereto, thereby obtaining a laminated film. A laminated film having a lamination structure as shown in FIG. 1 was produced as described above.

Example 1-2

A laminated film was produced in the same manner as in Example 1 except that a barrier layer was produced using a VM-PET film (manufactured by OIKE & Co., Ltd., trade name: TETOLIGHT EX-R, base material thickness: 12 μm, the mass-average molecular weight of a resin configuring the base material: approximately 100,000) instead of the VM-PET film (manufactured by Toray International, Inc., trade name: BR-TET1312, base material thickness: 12 μm).

Example 1-3

A laminated film was produced in the same manner as in Example 1 except that a PET film (trade name: FE2001, thickness: 12 μm, manufactured by Futamura Chemical Co., Ltd.) was used as the base material layer instead of the silica vapor-deposited PET film.

Example 1-4

A laminated film was produced in the same manner as in Example 1-1 except that, instead of the first composition for forming a loading material, the first resin composition was applied onto the aluminum particle layer of the VM-PET film (manufactured by Toray International, Inc., trade name: BR-PET1312, base material thickness: 12 μm, the mass-average molecular weight of a resin configuring the base material: approximately 200,000), heated and dried at 90° C. for one minute to form a barrier layer having a coat layer with a thickness of 0.5 μm.

Example 1-5

A laminated film was produced in the same manner as in Example 1-1 except that the first composition for forming a loading material was applied onto the aluminum particle layer of the VM-PET film, heated and dried at 60° C. for one minute to form a barrier layer having a coat layer with a thickness of 0.1 μm.

Comparative Example 1-1

A laminated film was produced in the same manner as in Example 1-1 except that the first composition for forming a loading material was used as it was as a barrier layer without being applied onto the VM-PET film.

Comparative Example 1-2

A laminated film was produced in the same manner as in Example 1-2 except that the first composition for forming a loading material was used as it was as a barrier layer without being applied onto the VM-PET film.

<Production of Pouch>

Two laminated films (sizes: 100 mm×100 mm) of each of the examples and the comparative examples were prepared, a laminate was prepared by making the sealant layers of the two laminated films face each other, and the sealant layers were made to adhere together. At this time, an adhesive part was formed by making some of the peripheral part of the laminate adhere in a reversed C shape, and a part where the sealant layers were not made to adhere together (non-adhesive part) was formed. A pouch as a packaging bag having a non-adhesive part was produced as described above.

<Evaluation of Dissolution Curbing of Aluminum Particle Layer>

Approximately 20 g of a shampoo (pH=4.0 to 5.0) was enclosed as a content through the non-adhesive part of the pouch having the non-adhesive part. In addition, the pouch was stored for four weeks under humid-free conditions (45° C.). After the storage, the content was removed from the pouch, and the external appearance of the pouch surface was observed with an optical microscope. The observation magnification was set to 1500 times. The number of regions from which dissolution of aluminum was confirmed per unit area (10 mm×10 mm) was confirmed. The observation was performed at three arbitrary places, respectively. The results are shown in Table 1. In addition, the sizes of the regions where aluminum dissolved are shown in Table 1.

TABLE 1

|  | Example 1-1 | Example 1-2 | Example 1-3 | Example 1-4 | Example 1-5 | Comparative Example 1-1 | Comparative Example 1-2 |
|---|---|---|---|---|---|---|---|
| Number of regions where Al dissolution is confirmed | 0 | 5 to 10 | 0 | 0 | 3 to 8 | 10 or more | 20 or more |
| Sizes (μm) of regions where Al dissolution is confirmed | — | 10 to 15 | — | — | 5 to 15 | 5 to 25 | 20 to 40 |

In Examples 1-1, 1-3 and 1-4, aluminum dissolution was not confirmed in all of the three observed places. In Example 1-2, dissolution of aluminum was confirmed in five regions in two places of the three observed places and dissolution of aluminum was confirmed in 10 regions in one place of the three observed places. In Example 1-5, dissolution of aluminum was confirmed in three regions, four regions and eight regions in the three observed places, respectively. In Comparative Example 1-1, dissolution of aluminum was confirmed in 10 or more regions in all of the three observed places, respectively. In Comparative Example 1-2, dissolution of aluminum was confirmed in 20 or more regions in all of the three observed places, respectively. In Comparative Examples 1-1 and 1-2 where the composition for forming a loading material was not applied to the aluminum particle layer, dissolution of aluminum was significantly observed. On the other hand, in Examples 1-1 to 1-5 where the heated and dried product of the composition for forming a loading material or the resin composition was loaded into gaps between aluminum in the aluminum particle layer, dissolution of aluminum was curbed.

Example 2-1

A base material layer composed of biaxially stretched polypropylene having a thickness of 20 μm (manufactured by Mitsui Chemicals Tohcello, Inc., trade name: U-1) was prepared.

On the other hand, VM-OPP obtained by forming an aluminum particle layer (aluminum vapor-deposited layer) on an EVOH layer of a coextrusion biaxially stretched polypropylene film of polypropylene and EVOH by vapor deposition (manufactured by Max Speciality Films Limited, trade name: M15SL6, thickness: 15 μm) was prepared, a resin composition composed of a polyolefin copolymer resin emulsion including particles composed of a polyolefin copolymer resin (a copolymer of an unsaturated carboxylic acid or an anhydride thereof and an ethylene-based hydrocarbon) (manufactured by Unitika Ltd., trade name: ARROWBASE SD5200, number-average particle diameter of particles: 1 μm or less, hereinafter "second resin composition") was applied onto an aluminum particle layer of the VM-OPP, heated and dried at 90° C. for one minute, thereby forming a barrier layer having a coat layer with a thickness of 0.5 μm.

In addition, a urethane-based adhesive (manufactured by DIC Corporation, trade name: LX500/KW-75) was applied onto the base material layer using a dry laminator, and the barrier layer obtained as described above was pasted thereto with the coat layer facing the base material layer, thereby obtaining a laminate. Subsequently, a urethane-based adhesive (manufactured by DIC Corporation, trade name: LX500/KW-75) was applied onto the barrier base material of the laminate using the dry laminator, and a sealant layer composed of LLDPE having a thickness of 100 μm (manufactured by Tamapoly Co., Ltd., trade name: LK410L) was pasted thereto, thereby producing a laminated film. A laminated film having a lamination structure as shown in FIG. 1 was produced as described above.

Example 2-2

A laminated film was produced in the same manner as in Example 2-1 except that, instead of the second resin composition, the following second composition for forming a loading material was applied onto the aluminum particle layer of the VM-OPP, heated and dried at 60° C. for one minute to form a coat layer with a thickness of 0.5 μm, thereby producing a barrier layer.

<Adjustment of Second Composition for Forming Loading Material>

A second composition for forming a loading material was prepared by mixing the following liquid A and liquid B in a mass ratio of 70/30 (liquid A/liquid B).

Liquid A: A hydrolysis solution having a solid content of 5 mass % (in terms of $SiO_2$) obtained by adding 72.1 g of 0.1N hydrochloric acid to 17.9 g of tetraethoxysilane (Si $(OC_2H_5)_4$) and 10 g of methanol and hydrolyzing the components by 30 minutes of stirring.

Liquid B: A 5 mass % water/methanol solution (the mass ratio between water and methanol was 95:5) of polyvinyl alcohol.

Example 2-3

A laminated film was produced in the same manner as in Example 2-1 except that VM-OPP (manufactured by Mitsui Chemicals Tohcello, Inc., trade name: ML-OP102, thickness: 25 μm) was used instead of the VM-OPP film (manufactured by Max Speciality Films Limited, trade name: M15SL6, thickness: 15 μm).

Example 2-4

VM-PE obtained by forming an aluminum particle layer (aluminum vapor-deposited layer) on a polyethylene film (sealant layer) by vapor deposition (manufactured by Mitsui Chemicals Tohcello, Inc., trade name: TUX-F, thickness: 50 μm) was prepared, the second resin composition was applied onto an aluminum particle layer in the same manner as in Example 2-1 to form a 0.5 μm coat layer, thereby obtaining a laminate. A urethane-based adhesive (manufactured by DIC Corporation, trade name: LX500/KW-75) was applied onto the coat layer-side surface of the laminate using a dry laminator, and a barrier base material layer composed of HDPE (manufactured by Tamapoly Co., Ltd., trade name: HS31, thickness: 30 μm) was pasted thereto, thereby producing a laminated film.

Example 2-5

A laminated film was produced in the same manner as in Example 2-1 except that CPP (manufactured by Mitsui Chemicals Tohcello, Inc., trade name: GLE, thickness: 60 μm) was used as a sealant layer instead of LLDPE (Tamapoly Co., Ltd., trade name: LK410L).

Example 2-6

A laminated film was produced in the same manner as in Example 2-1 except that the second resin composition was applied onto the aluminum particle layer of VM-OPP to form a 0.1 μm coat layer.

Comparative Example 2-1

A laminated film was produced in the same manner as in Example 2-1 except that the second resin composition was used as a barrier layer without being applied to VM-OPP.

Comparative Example 2-2

A laminated film was produced in the same manner as in Example 2-4 except that the second resin composition was used as a barrier layer without being applied to VM-PE.

<Production of Pouch>

Two laminated films (sizes: 100 mm×100 mm) of each of Examples 2-1 to 2-6 and Comparative Examples 2-1 and 2-2 were prepared, a laminate was prepared by making the sealant layers of the two laminated films face each other, and the sealant layers were made to adhere together. At this time, an adhesive part was formed by making some of the peripheral part of the laminate adhere in a reversed C shape, and a part where the sealant layers were not made to adhere together (non-adhesive part) was formed. A pouch as a packaging bag having a non-adhesive part was produced as described above.

Next, a body soap (pH=8.5 to 9.1) was loaded as a content through the non-adhesive part of the pouch having the non-adhesive part. After that, the sealant layers of the laminated films were made to adhere together in the non-adhesive part to make the non-adhesive part into the adhesive part as well. A packaging bag was produced as described above.

<Evaluation of Adhesion Between Base Material Layer and Barrier Layer and Evaluation of Dissolution Curbing of Aluminum Particle Layer>

Two packaging bags obtained as described above were prepared regarding Example 2-1 and Comparative Example 2-1, respectively.

In addition, regarding one packaging bag, three 80 mm×15 mm test pieces were immediately taken out from the packaging bag sample, a tensile test was performed on the three test pieces by T-type peeling, and the lamination strength (unit: N/15 mm) between the base material layer and the barrier layer was measured as the initial lamination strength. At this time, the tensile test was performed at a rate of 300 mm/min. The results are shown in Table 2.

On the other hand, the other packaging bags of Example 2-1 and Comparative Example 2-1 and the packaging bags of Examples 2-2 to 2-6 and Comparative Example 2-2 were placed under conditions of 45° C. and normal humidity, an accelerated test was performed thereon, and the packaging bags were stored for one month. After the accelerated test, three 80 mm×15 mm test pieces were taken out from each of the packaging bag samples, a tensile test was performed in the same manner on the three test pieces, and the lamination strength (unit: N/15 mm) between the base material layer and the barrier layer was measured as the lamination strength after one month. The results are shown in Table 2. In addition, the decrease rate of the lamination strength was calculated from the initial lamination strength and the lamination strength after one month based on the following equation.

Decrease rate of lamination strength (%)=100×($A0$−$A1$)/$A0$ (In the equation, $A0$ indicates the initial lamination strength, and $A1$ indicates the lamination strength after one month.)

TABLE 2

|  |  | Example 2-1 | Comparative Example 2-1 |
|---|---|---|---|
| Lamination strength (initial) | N/15 mm | 4.1 | 4.4 |
| Lamination strength (after one month) | N/15 mm | 3.9 | 2.8 |
| Decrease rate of lamination strength | % | 4.9 | 36.4 |

It was found from the results shown in Table 2 that, in the laminated film of Example 2-1, the decrease rate of the lamination strength from before the accelerated test to one month after the accelerated test was curbed to a sufficiently small extent compared with the laminated film of Comparative Example 2-1.

In addition, regarding each of the packaging bags after the accelerated test, the content was taken out from the pouch after storage, and the external appearance of the pouch surface was observed with an optical microscope. The observation magnification was set to 1500 times. The number of regions from which dissolution of aluminum was confirmed per unit area (10 mm×10 mm) was confirmed. The observation was performed at three arbitrary places, respectively. The results are shown in Table 3. In addition, the sizes of the regions where aluminum dissolved are shown in Table 3.

TABLE 3

|  | Example 2-1 | Example 2-2 | Example 2-3 | Example 2-4 | Example 2-5 | Example 2-6 | Comparative Example 2-1 | Comparative Example 2-2 |
|---|---|---|---|---|---|---|---|---|
| Number of regions where Al dissolution is confirmed | 0 | 0 | 5 to 10 | 8 to 15 | 0 | 4 to 8 | 10 or more | 20 or more |
| Sizes (μm) of regions where Al dissolution is confirmed | — | — | 5 to 10 | 5 to 15 | — | 5 to 15 | 10 to 30 | 20 to 40 |

In Examples 2-1, 2-2 and 2-5, aluminum dissolution was not confirmed in all of the three observed places. In Example 2-3, dissolution of aluminum was confirmed in five regions, seven regions and 10 regions in the three observed places, respectively. In Example 2-4, dissolution of aluminum was confirmed in eight regions, 10 regions and 15 regions in the three observed places, respectively. In Example 2-6, dissolution of aluminum was confirmed in four regions in the two observed places and eight regions in the one remaining place. In Comparative Example 2-1, dissolution of aluminum was confirmed in 10 or more regions in all of the three observed places, respectively. In Comparative Example 2-2, dissolution of aluminum was confirmed in 20 or more regions in all of the three observed places, respectively. In Comparative Examples 2-1 and 2-2 where the composition for forming a loading material was not applied to the aluminum particle layer, dissolution of aluminum was significantly observed. On the other hand, in Examples 2-1 to 2-6 where the heated and dried product of the composition for forming a loading material or the resin composition was loaded into gaps among aluminum in the aluminum particle layer, dissolution of aluminum was curbed.

From what has been described above, it was confirmed that, according to the laminated film of the present disclosure, it is possible to curb dissolution of the aluminum particle layer even when made to be in contact with materials including an acidic or alkaline liquid for a long period of time while maintaining favorable recyclability.

The main points of the present disclosure lie in the following [1] to [11].

[1] A laminated film including a barrier layer and at least one adjacent layer that is adjacent to the barrier layer, in which the barrier layer has a barrier base material and a coat layer that is provided on one surface of the barrier base material so as to face the adjacent layer, the coat layer is composed of an aluminum particle layer composed of aluminum particles and a resin composition that is loaded into gaps in the aluminum particle layer, and the barrier base material and the adjacent layer include the same resin.

[2] The laminated film according to [1], in which the resin composition is a heated and dried product of a composition including a water-soluble polymer and at least one selected from the group consisting of a metal alkoxide, a silane coupling agent and hydrolysates thereof.

[3] The laminated film according to [1], in which the resin composition includes a polyolefin resin modified by at least one compound selected from the group consisting of an unsaturated carboxylic acid, an ester thereof and an acid anhydride thereof.

[4] The laminated film according to any one of [1] to [3], in which the coat layer includes a region that extends along a longitudinal direction of the coat layer and includes no aluminum particles.

[5] The laminated film according to any one of [1] to [4], in which at least one adjacent layer is a base material layer and a sealant layer that are provided on both sides of the barrier layer.

[6] The laminated film according to any one of [1] to [5], in which the coat layer has a thickness of 0.1 μm or more.

[7] The laminated film according to any one of [1] to [6], in which the barrier base material and the adjacent layer include a polyester resin as the same resin, and a total mass of the polyester resin is 90 mass % or more based on a total amount of the laminated film.

[8] The laminated film according to any one of [1] to [6], in which the barrier base material and the adjacent layer include a polyolefin resin as the same resin, and a total mass of the polyolefin resin is 90 mass % or more based on a total amount of the laminated film.

[9] The laminated film according to any one of [1] to [6], in which the barrier base material and the adjacent layer include a polypropylene resin as the same resin, and a total mass of the polypropylene resin is 90 mass % or more based on a total amount of the laminated film.

[10] The laminated film according to any one of [1] to [6], in which the barrier base material and the adjacent layer include a polyethylene resin as the same resin, and a total mass of the polyethylene resin is 90 mass % or more based on a total amount of the laminated film.

[11] The laminated film according to any one of [1] to [7], in which the barrier base material includes a polyester resin, and the polyester resin that is included in the barrier base material has a mass-average molecular weight of 10,000 to 1,000,000.

[12] The laminated film according to any one of [1] to [11], in which a water vapor permeability is 5 g/m$^2$·day or less.

[13] The laminated film according to any one of [1] to [12], in which an oxygen permeability is 1 cc/m$^2$·day·atm or less.

[14] A packaging bag formed using the laminated film according to any one of [1] to [13].

REFERENCE SIGNS LIST

100, 300, 600, 700 Laminated film
10 Base material layer (adjacent layer)

50 Sealant layer (adjacent layer)
20, 40 Adhesive layer
30 Barrier layer
400 Packaging bag
500 Packaging body
C content

The invention claimed is:

1. A laminated film comprising:
a barrier layer; and
at least one adjacent layer that is adjacent to the barrier layer,
wherein the barrier layer has a barrier base material and a coat layer that is provided on one surface of the barrier base material so as to face the adjacent layer,
the coat layer is composed of an aluminum particle layer composed of aluminum particles and a resin composition that is loaded into gaps in the aluminum particle layer, and
the barrier base material and the adjacent layer include the same resin.

2. The laminated film according to claim 1,
wherein the resin composition is a heated and dried product of a composition including a water-soluble polymer and at least one selected from the group consisting of a metal alkoxide, a silane coupling agent and hydrolysates thereof.

3. The laminated film according to claim 1,
wherein the resin composition includes a polyolefin resin modified by at least one compound selected from the group consisting of an unsaturated carboxylic acid, an ester thereof and an acid anhydride thereof.

4. The laminated film according to claim 1,
wherein the coat layer includes a region that extends along a longitudinal direction of the coat layer and includes no aluminum particles.

5. The laminated film according to claim 1,
wherein at least one adjacent layer is a base material layer and a sealant layer that are provided on both sides of the barrier layer.

6. The laminated film according to claim 1,
wherein the coat layer has a thickness of 0.1 μm or more.

7. The laminated film according to claim 1,
wherein the barrier base material and the adjacent layer include a polyester resin as the same resin, and
a total mass of the polyester resin is 90 mass % or more based on a total amount of the laminated film.

8. The laminated film according to claim 1,
wherein the barrier base material and the adjacent layer include a polyolefin resin as the same resin, and a total mass of the polyolefin resin is 90 mass % or more based on a total amount of the laminated film.

9. The laminated film according to claim 1,
wherein the barrier base material and the adjacent layer include a polypropylene resin as the same resin, and a total mass of the polypropylene resin is 90 mass % or more based on a total amount of the laminated film.

10. The laminated film according to claim 1,
wherein the barrier base material and the adjacent layer include a polyethylene resin as the same resin, and a total mass of the polyethylene resin is 90 mass % or more based on a total amount of the laminated film.

11. The laminated film according to claim 1,
wherein a water vapor permeability is 5 $g/m^2 \cdot day$ or less.

12. The laminated film according to claim 1,
wherein an oxygen permeability is 1 $cc/m^2 \cdot day \cdot atm$ or less.

13. The laminated film according to claim 1,
wherein the barrier base material includes a polyester resin, and the polyester resin that is included in the barrier base material has a mass-average molecular weight of 10,000 to 1,000,000.

14. A packaging bag formed using the laminated film according to claim 1.

* * * * *